Sept. 18, 1956 M. A. DEMEULENAERE ET AL 2,763,727

AUTOMATIC DIAL OPERATOR

Filed Dec. 11, 1952 4 Sheets-Sheet 1

INVENTORS.
MARCEL A. DEMEULENAIRE.
ROBERT O. DEMEULENAIRE.
BY Ward, Neal, Haselton, Orme & McElhannon
ATTORNEYS.

Sept. 18, 1956 M. A. DEMEULENAERE ET AL 2,763,727

AUTOMATIC DIAL OPERATOR

Filed Dec. 11, 1952 4 Sheets-Sheet 2

INVENTORS.
MARCEL A. DEMEULENAIRE
ROBERT O. DEMEULENAIRE.
BY Ward, Neal, Haselton, Orme & McElhannon
ATTORNEYS.

INVENTORS.
MARCEL A. DEMEULENAIRE.
ROBERT O. DEMEULENAIRE.
BY Ward, Neal, Haselton, Orme & McElhannon
ATTORNEYS Sept. 18, 1956 M. A. DEMEULENAERE ET AL 2,763,727

AUTOMATIC DIAL OPERATOR

Filed Dec. 11, 1952 4 Sheets-Sheet 4

INVENTORS.
MARCEL A. DEMEULENAIRE.
ROBERT O. DEMEULENAIRE.
BY Ward, Neal, Haselton, Orme & McElhannon
ATTORNEYS.

2,763,727
Patented Sept. 18, 1956

2,763,727

AUTOMATIC DIAL OPERATOR

Marcel Antoine Demeulenaere and Robert Oscar Demeulenaere, New York, N. Y.

Application December 11, 1952, Serial No. 325,365
9 Claims. (Cl. 179—90)

This invention relates to a device for actuating the dial of a telephone instrument forming part of a dial telephone system and particularly to a device which, upon one actuation of a single key, will rotate the dial of a telephone instrument in the manner necessary to place a call to a desired party.

The dialing device of the present invention has keys which, when depressed against a spring, close to the feeding system of a motor driving a mechanism connected to the dial of an automatic telephone. Each of the keys also, when depressed, causes the intervention between this mechanism and the dial, of means which controls the movement of the dial, and in which means the number which it is desired to dial has been registered.

Devices of this nature are known in which there are parts having rectilinear motion which function during the dialing and during the setting-up and the wiping-out of a number. With these the caller can initially register the number which he wants to dial automatically by pushing down the corresponding keys and he can later on substitute other numbers for the old ones.

The present invention has for its purpose another automatic dialing device in which the parts with rectilinear motion, the construction and functioning of which lead to certain difficulties, are replaced by parts having rotating motion.

This invention has also the advantage that less time is necessary for the automatic dialing of a number and that the time required to dial each digit of the number is proportional to the digit itself and not to the highest digit to be dialed.

Another advantage of this invention is that the setting-up and wiping-out of a number is possible even when the device is not connected to the phone. This also permits a caller to register in succession the different digits of a number without having to stop the motor, which activates the device. Finally, the time for dialing each digit can be accelerated without fear that this may cause some errors, because the driving of the phone dial by the motor is suspended in a positive fashion.

Other characteristics and details of the invention will appear from the following detailed description of the embodiment shown in the accompanying drawings which represent schematically one form of device incorporating the invention. In the drawings.

Figures 1, 2:
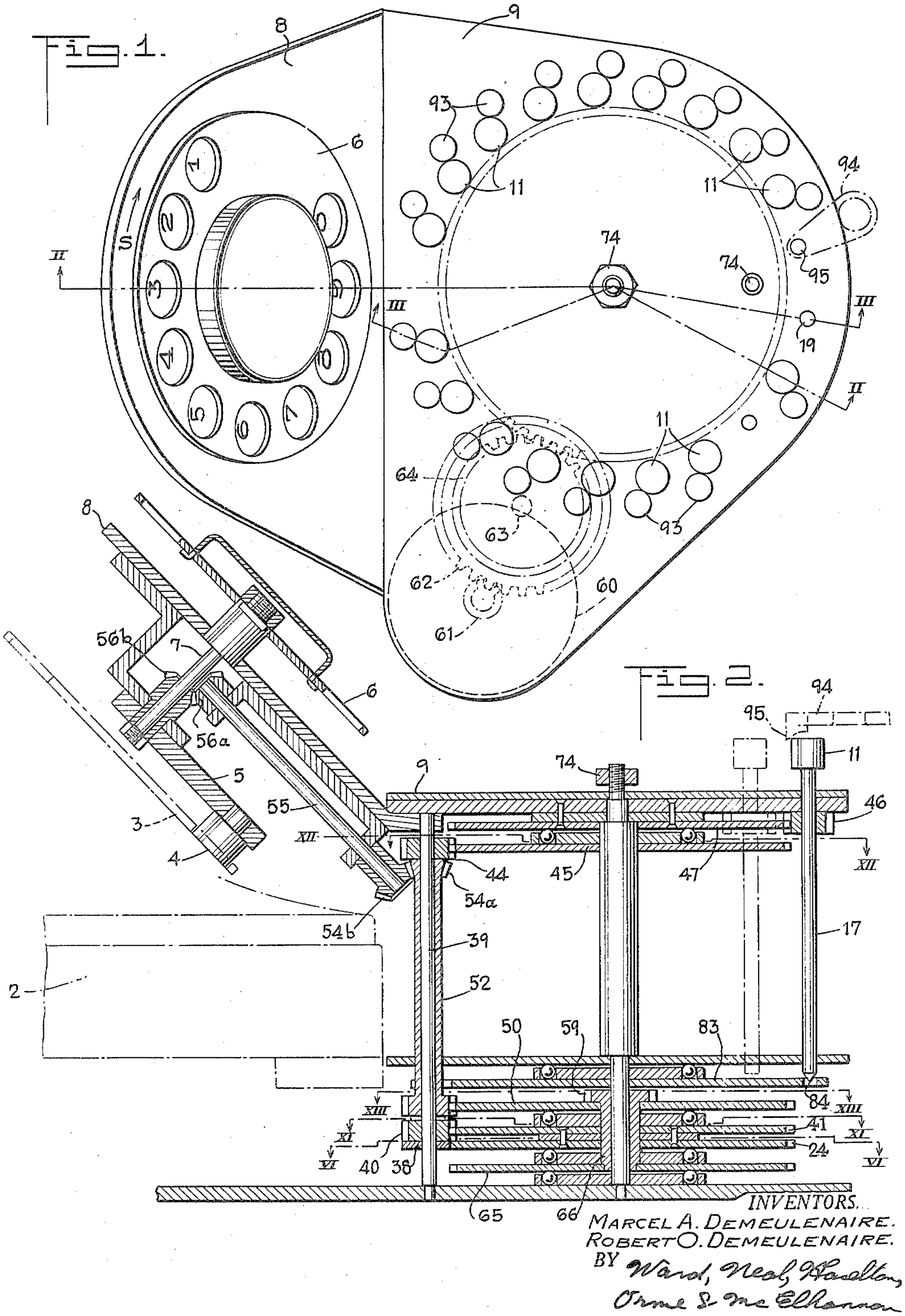
Fig. 1 is a plan view of an embodiment of the invention.
Fig. 2 is a vertical section taken along the line II—II indicated in Fig. 1, certain elements of the device being omitted for simplicity in illustration.
Figure 9:
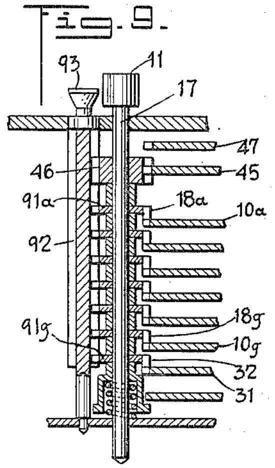
Figure 3:
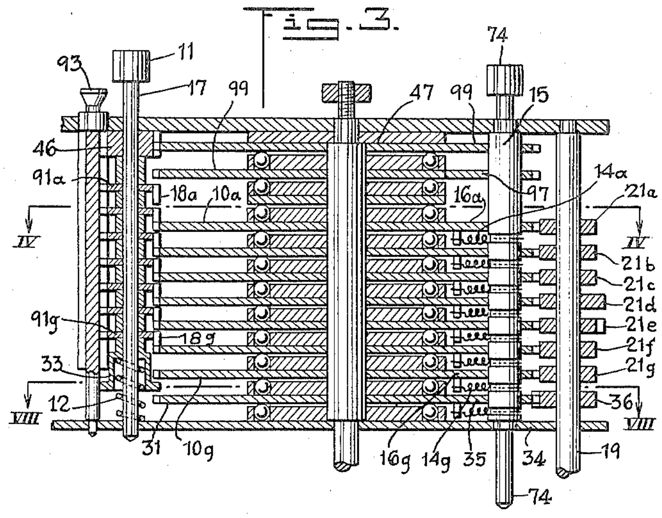
Fig. 3 is a vertical section taken along the line III—III indicated in Fig. 1, the elements omitted in Fig. 2 being shown in Fig. 3 and certain elements shown in Fig. 2 being omitted in Fig. 3.
Figures 4, 5A, 5B, 5C, 5D, 5E, 5F, 5G, 5H, 6:
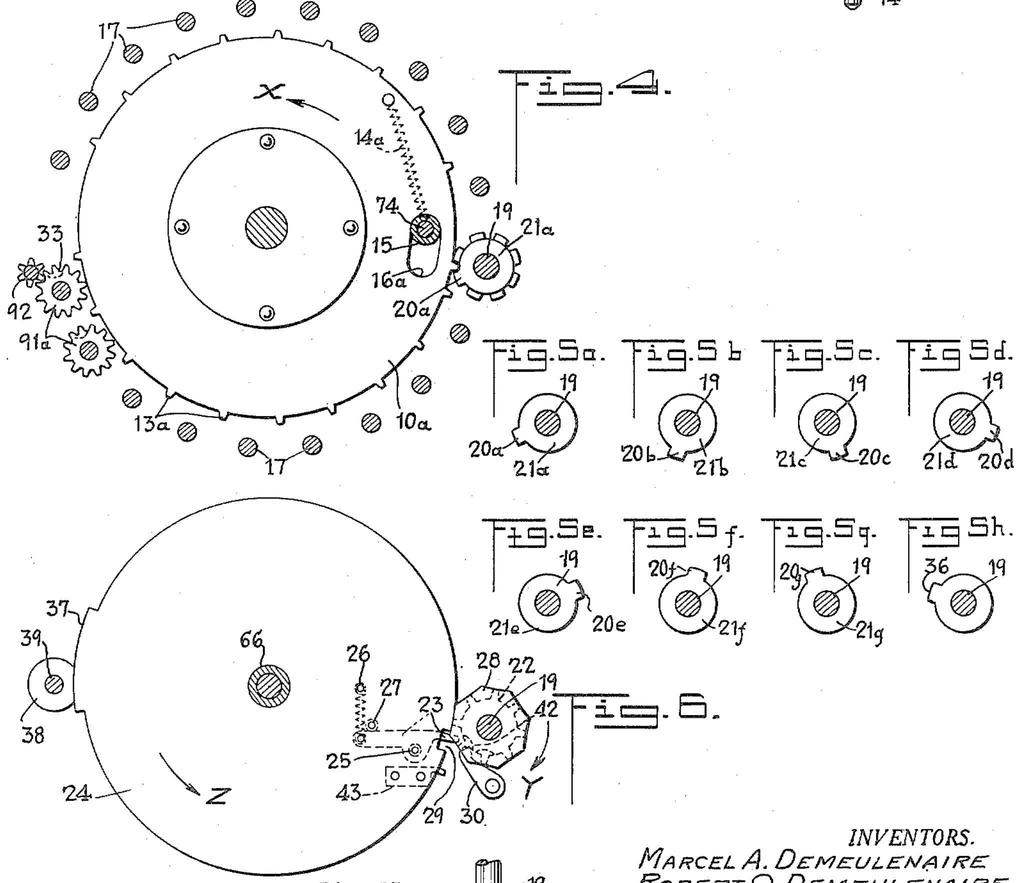
Fig. 4 is a horizontal section taken along the line IV—IV indicated in Fig. 3 with certain elements omitted.
Figure 7:
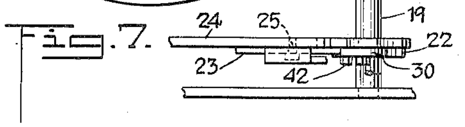
Figure 8:
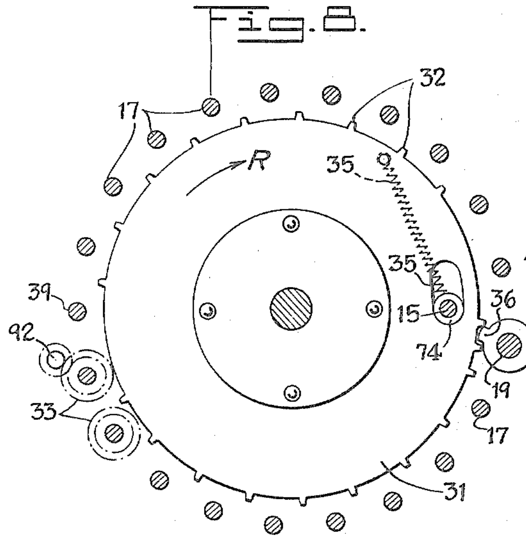
Figure 12:
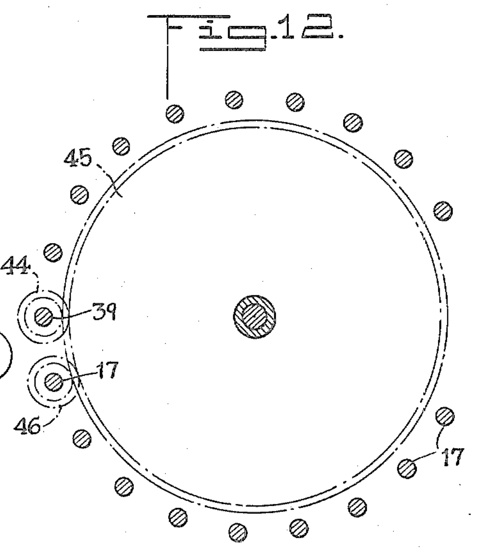
Figures 11, 13:
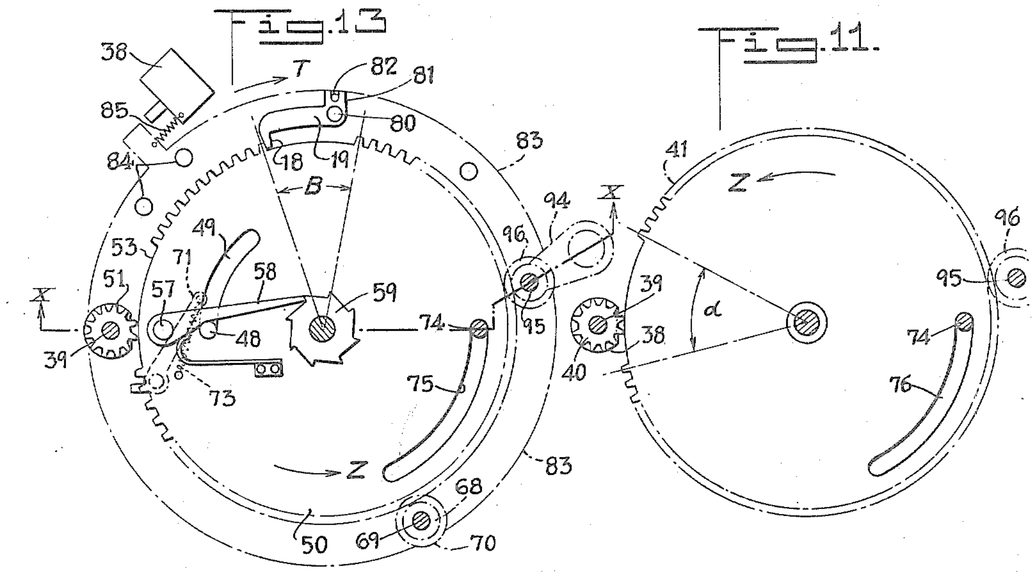
Figure 10:
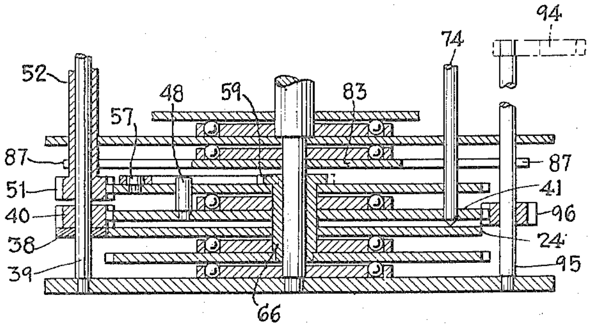
Figure 14:
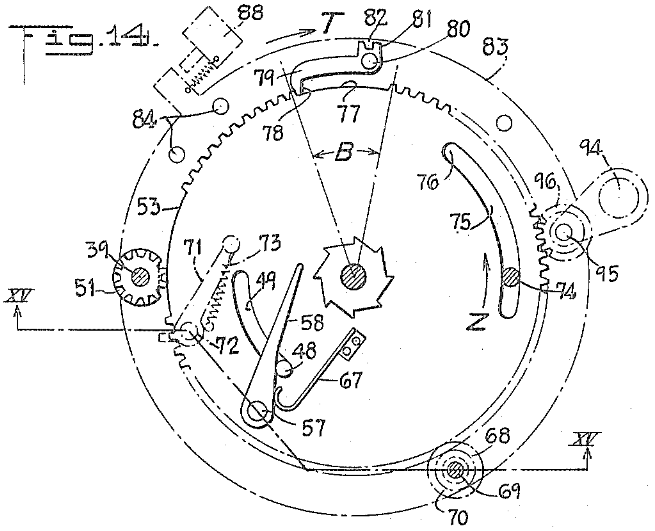
Figure 18:
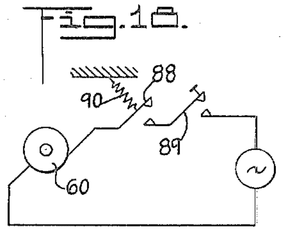
Figure 19:
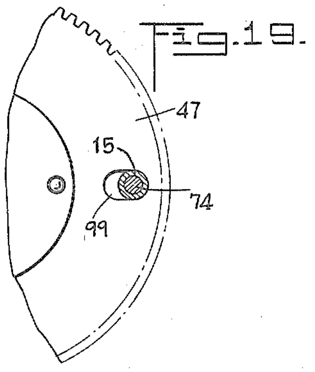
Figures 15, 16:
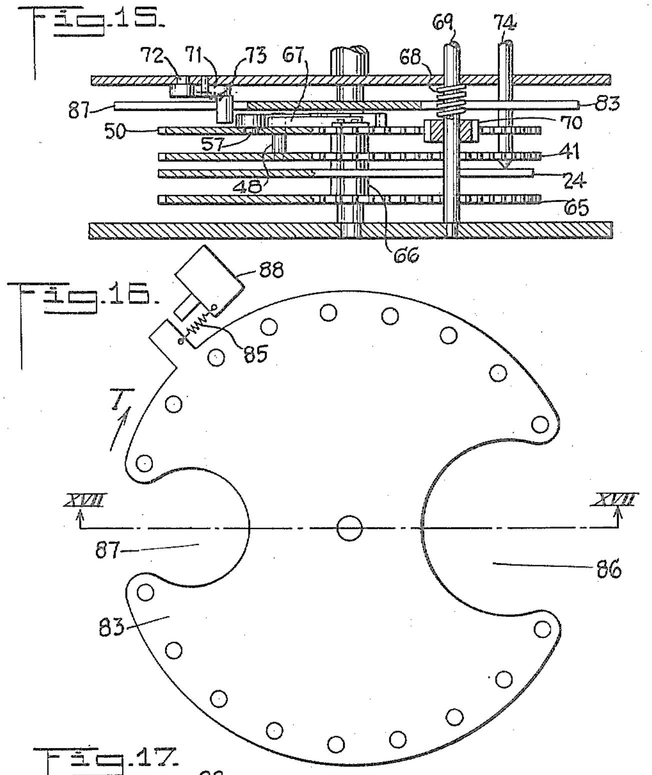
Figure 17:
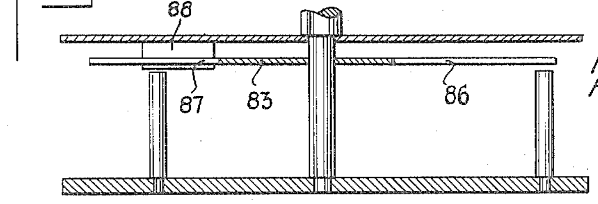

Figs. *5a–5h* represent schematically and in elevation the angular positions of certain parts shown in Fig. 3 and mounted on a common rotatable shaft also shown in Fig. 3;

Fig. 6 is a horizontal section taken along the line VI—VI indicated in Fig. 2 with certain elements omitted;

Fig. 7 is a fragmentary, front elevation view of the parts shown in Fig. 6;

Fig. 8 is a plan view taken along the line VIII—VIII indicated in Fig. 3 with certain elements omitted;

Fig. 9 is a fragmentary elevation view of the elements represented in Fig. 3 with some of these elements in positions different from those shown in Fig. 3;

Fig. 10 is a vertical section taken along the line X—X indicated in Fig. 13;

Fig. 11 is a plan view taken along the line XI—XI indicated in Fig. 2 with certain elements omitted;

Fig. 12 is a plan view taken along the line XII—XII indicated in Fig. 2 with certain elements omitted;

Fig. 13 is a plan view taken along the line XIII—XIII indicated in Fig. 2 with certain elements omitted;

Fig. 14 is a plan view similar to the plan view of Fig. 13 for a different position of the elements which are shown in Fig. 13;

Fig. 15 is a vertical section taken along the line XV—XV indicated in Fig. 14;

Fig. 16 is a plan view of a plate shown in Fig. 2 and which is moved by depressing the calling keys;

Fig. 17 is a vertical section taken along the line XVII—XVII indicated in Fig. 16 and showing certain elements omitted in Fig. 16;

Fig. 18 is a diagram of the energizing circuit for the motor which drives the device of the invention;

Fig. 19 is a fragmentary, plan view of a fixed gear shown in Fig. 3; and

Figure 20:
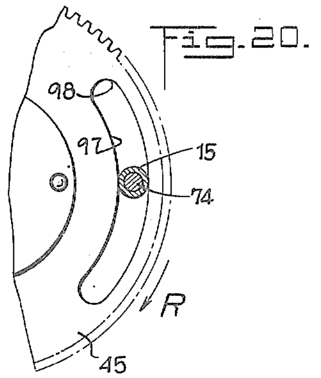

Fig. 20 is a fragmentary, plan view of a movable gear shown in Fig. 3.

In the different figures of the drawings, the reference characters represent identical elements.

Fig. 2 illustrates in dotted lines a part of the telephone instrument 2, the dial of which is designated by the numeral 3. A finger 4 is engaged with dial 3 and is inserted in the hole corresponding to the digit "0." Finger 4 is carried by an arm 5 which may be driven by an auxiliary dial 6 which is fixed to a shaft 7 which carries the arm 5. The purpose of the auxiliary dial 6 is to turn the dial 3 of the apparatus 2 in order to make the usual calls in the same manner that one directly operates the dial 3. The auxiliary dial 6 is carried by a plate 8 fitted on a frame 9 on which are arranged most of the parts forming the device of the invention.

On the frame 9, there are a series of disks equal in number to the number of digits and/or letters to be selected in dialing the number representing a party to be called. These disks are designated by the number 10 followed by a letter (Fig. 3). In order to simplify Fig. 3 only the two first disks 10*a* and 10*b* and also the last disk 10*g* are marked by reference characters. These different disks 10*a*, 10*b*, etc. are arranged one above the other along the same axis.

The device also has a number of keys 11, the selected one of which, as will be explained later, must be depressed in order to cause the automatic dialing of a number, to set up a number or to wipe out such a number from the device.

The keys 11 are caused by springs 12 to occupy their upward positions. They are arranged in a circle around the disks 10*a* to 10*g*. These disks 10*a*, 10*b*, etc. are provided with as many radial projections 13*a*, 13*b*, etc. as there are keys 11 arranged around them. These radial projections are designated from now on by the number 13 followed by the same letter as the one related to the disks 10*a*, 10*b*, etc. to which these projections belong.

In Fig. 4 the projections 13*a* of the upper disk 10*a* are shown.

The keys 11 are arranged around the disks 10*a* to 10*g* between the projections 13*a* to 13*g* of the latter when the disks occupy a position of rest to which they are constantly urged in the direction of the arrow X by springs 14*a*, 14*b*, etc. These springs are designated by the number 14 followed by the same letter as the one following the reference numeral of the corresponding disk 10. Each one of these springs is fixed, on one hand, to the disk to which it applies a restoring force and, on the other hand, to a sleeve 15 (Figs. 3 and 4) extending through a slot cut in each disk. The slots related to the different disks are designated by the reference characters 16*a* to 16*g*. The slot 16*a* is visible in Fig. 4.

The keys 11 are carried by rods 17 the axes of which are parallel to the axis of the disks 10*a* to 10*g*. The rod 17 of each key 11 carries as many projections 18*a* to 18*g* as there are disks 10*a* to 10*g*. These projections are designated by the reference characters 18*a* to 18*g*. The projections 18*a*—18*g* are, when the keys 11 are not depressed, at levels different from the levels of the projections 13*a* to 13*g* of the disks 10*a* to 10*g*. After depressing the keys 11 the projections 18*a* to 18*g* are individually at the levels of the projections 13*a* to 13*g* of the disks 10*a*—10*g*.

The disks 10*a* to 10*g* may be put in rotation separately. The amount of this rotation is such that the projections of the rotated disk (i. e., the projections 13*a* of disk 10*a*) are brought diametrally in line with the axes of the rods 17 when the rotation has ended.

Each rod 17 occupies with respect to the disks 10*a* to 10*g* a relative position such that if one would turn the rod 17 after having depressed the corresponding key 11 and after having brought the adjacent projection of a disk (i. e., a projection 13*a* of disk 10*a*) in line with the axis of the selected rod 17, its projection (i. e. 18*a*), which is at the level of the projection on the corresponding disk, will be stopped by the projection on the disk.

The projections 18*a* to 18*g* on the rod 17 of any one of the keys 11 occupy, with respect to the positions occupied by the projections 13*a* to 13*g* when these have been brought in line with the axes of the rods 17, angular positions which are related to the angular positions occupied by the digits and/or letters on the dial 3 which compose the telephone number to be dialed by depressing the key 11 corresponding to such telephone number.

The relative angular positions of the projections 18*a* to 18*g* are determined at the time of the setting-up of a key 11, in a way that will be explained later to subsequently cause dialing of a telephone number.

The position of rest of each of the disks 10*a* to 10*g* is such that the projections 13*a* to 13*g* are not in the path of the projections 18*a* to 18*g* when the rods 17 turn. These latter projections are moved either during the dialing time or during the setting-up or wiping-out of a telephone number in a way that will be explained later.

The different disks 10*a* to 10*g* are put successively in rotation as far as this is necessary to bring their projections 13*a* to 13*g* in line with the axes of the rods 17 by means of arms arranged individually at the level of each of the disks and rotatively movable with a shaft 19 which carries them. The different arms are designated by the numeral 20 followed by the same letter *a* to *g* as the one which designates one of the disks 10*a* to 10*g* with which the arm in question cooperates. The different arms 20*a* to 20*g* (Figs. 3, 4 and 5*a*–5*g*) occupy angular positions which are equidistant on the rotatable shaft 19. These different positions are shown in Figs. 5*a*–5*g* from left to right for the arms occupying successively lower levels. These different arms are secured to and rotatable by the rotatable shaft 19 by means of rings designated by reference characters 21*a* to 21*g*.

The rotatable shaft 19 is rotatable by a gear 22 (Figs. 6 and 7) which is driven in the direction of arrow Y by an articulated spur-tooth 23 carried by the first rotatable plate 24 when this plate is rotated in the direction Z in a manner that will be explained later.

This articulated spur-tooth 23 can oscillate around a pivot 25. It is constantly acted upon by a spring 26 which tends to bring it back against a stop 27 fixed on the first plate 24. The rotatable shaft 19 is also secured to a first Geneva wheel 28 cooperating with this plate 24 and presenting as many curved sides as there are teeth to the gear 22. The number of these teeth is equal to the number of disks 10*a* to 10*g* increased by one. The justification of this number will be given later on.

A notch 29 is provided on the first plate 24 in order to allow the rotation of the Geneva-wheel 28 when the articulated spur-tooth 23 drives one of the teeth of the gear 22. A pawl 30 (Fig. 6) is provided in order to prevent the rotation of gear 22, and of the parts which are driven with it, in the direction opposite to the direction of the arrow Y.

A supplementary disk 31 (Figs. 3 and 8) having the same axis as the disks 10*a* to 10*g* is provided and has as many radial projections 32 as there are keys 11. It can be put in rotation separately from the disks 10*a* to 10*g* in such a way that the projections 32 are brought in line with the axes of the rods 17. Each one of these keys 11 has a circular stop 33 (Fig. 3) mounted thereon which stop 33 occupies an axial position such that when the selected key has been depressed and then the supplementary disk 31 is brought in the position in which its radial projections 32 are in line with the axes of the rods 17, the above circular stop 33 meets the adjacent projection 32 of this disk 31 preventing the return of the selected key 11 to its undepressed or rest position.

In Fig. 9 there is shown a key 11 in its depressed position in which the circular stop 33 is under one of the radial projections 32 of the disk 31 and in which also the different projections 18*a* to 18*g* are at the level respectively of the disks 10*a* to 10*g*.

The supplementary disk 31 is constantly urged by a spring 34 (Fig. 8) into a position in which its projections 32 are engaged by the circular stops 33 of the rods 17 during an axial displacement of these rods. The force of the spring 34 urges the supplementary disk 31 in the direction of the arrow R. The spring 34 is fixed, on one hand, to this disk 31 and, on the other hand, to the sleeve 15. This sleeve passes through a slot 35 cut into the disk 31.

A supplementary arm 36 (Figs. 5*h* and 8) is provided on the rotatable shaft 19. It occupies with respect to the other arms 20*a* to 20*g* an angular position such that it prevents the supplementary disk 31 from occupying the position towards which it is constantly urged, when none of the other arms 20*a* to 20*g* is in a position in which the projections 13*a* to 13*g* of any one of the disks 10*a* to 10*g* are caused to enter the path of the projections 18*a* to 18*g* carried by the rods 17 of the keys 11. The angular position of the supplementary arm 36 is also such that this arm brings the supplementary disk 31 back in the position in which not one of the projections 32 can be engaged by the circular stops 32 of the rods 17 of any one of the keys 11, during the axial displacement of the latter, at the time that the other arms 20*a* to 20*g* are in a position in which the projections 13*a* to 13*g* are out of the paths of the projections 18*a* to 18*g* carried by the rods 17.

The first rotatable plate 24 has a radial projection 37 (Fig. 6) which cooperates with the second Geneva wheel 38 (Figs. 2, 6 and 10) fixed on a shaft 39. A gear 40 (Figs. 2, 10 and 11) fixed on the shaft 39 is arranged so that it can mesh with a second plate 41 which is rotatable with the plate 24. This second plate 41 is toothed except in a sector $\alpha$ (Fig. 11) which has the same arcuate length as the radial projection 37 of the first plate 24. This sector $\alpha$ is situated in such a way that it is opposite gear 40 when the device is at rest. Its length is such that when one turns the two plates 24 and 41 in the direction of the arrow Z causing the articulated spur-tooth 23 to drive the gear 22, the toothed part of the second plate 41 only comes in contact with the gear 40 after the rotatable shaft 19 has turned through an angle greater than the angle between two adjacent teeth of the gear 22. The result is that the arms 20*a* to 20*g* or the arm 36 act respectively on one of the disks 10*a* to 10*g* or the disk 31 before the toothed part of the second plate 41 can turn the gear 40.

The rotatable shaft 19 is provided with a projection 42 (Figs. 6 and 7) arranged in such a manner that it is brought adjacent the first plate 24 when the supplementary arm 36 of the rotatable shaft 19 has brought the supplementary disk 31 back to a position in which the projections 32 cannot be engaged by the circular stops 33 on the rods 17. In order to cooperate with the projection 42, the first plate 24 has, parallel to its axis, a projection 43 which during the rotation of this plate 24, in the direction of the arrow Z, engages the projection 42 of the rotatable shaft 19 when this projection 42 is adjacent the plate 24.

By this engagement the plates 24 and 41 are prevented from turning any farther in the direction of the arrow Z. The projection 43 is arranged at a small distance behind the articulated spur-tooth 23 if one considers the direction of rotation indicated by the arrow Z in Fig. 6. The result is that this projection 43 engages the projection 42, which is rotatably fixed with respect to the rotatable shaft 19, a little after this latter projection has been brought nearest the first plate 24 by the articulated spur-tooth 23.

The shaft 39, on which are fixed the second Genevawheel 38 and the gear 40, carries a second gear 44 (Figs. 2 and 12) which meshes with a gear 45 the axis of which is co-axial with the axis of the disks 10*a* to 10*g* and 31. The rods 17 of the keys 11 are also arranged in circle around this gear 45. In order to simplify the showing in Fig. 12 only one gear 46 has been shown. However, it will be understood that each of the rods 17 around this gear 45 carries and is drivable by a gear 46. The gears 46 are axially movable with the rods 17. When a key 11 is depressed, its associated gear 46 meshes with the gear 45 while, when the keys are released, the teeth of the gears 46 are engaged in the teeth of a fixed gear 47 (Fig. 2).

The second plate 41 carries a stud 48 (Figs. 10, 13 and 14) extending into an arcuate slot 49 cut into a third plate 50 which is coaxial with the two first plates 41 and 24. This third plate 50 is toothed except in two sectors 53 and $\beta$. A gear 51 is fixed on the sleeve 52 coaxial with the shaft 39. The sector 53 has the same length as the toothless sector $\alpha$ of the second plate 41 and is situated in such a way as to be opposite the gear 40 fixed on the shaft 39. The sleeve 52 is positively connected during rotation to the dial 3 of the telephone instrument 2 by means of conical gears 54*a* 54*b*, of a shaft 55, of conical gears 56*a* and 56*b*, of the shaft 7 of the arm 5 and of the finger 4.

The third plate 50 carries a pawl 58 which is mounted on a pivot 57 and which can be driven by a ratchet wheel 59 which is rotatable by an electric motor 60 (Fig. 1). The motor 60 is coupled to the ratchet-wheel 59 by means of the gears 61, 62, of a shaft 63 (Fig. 1), of the gears 64 and 65 (Figs. 2 and 10) the last year being fixed to the ratchet-wheel 59 by means of a sleeve 66 (Fig. 10).

The direction of rotation of the electric motor 60 is such that the dial 3 of the telephone instrument 2 is driven by this motor in the direction of the arrow S (Fig. 1) corresponding to the direction of dialing during an ordinary or manual operation of the dial 3. The corresponding direction of rotation of the third plate 50 is indicated by the arrow Z on Figs. 13 and 14.

The pawl 58 is arranged in such a way as to strike against the stud 48 when it is driven in the direction of the arrow Z by the ratchet-wheel 59. Consequently, it makes the first two plates 24 and 41 turn in the same direction. The pawl 58 is disengaged from the teeth of the ratchet-wheel 59 when it is in engagement with the stud 48 and this stud is prevented from turning in the direction of the arrow Z. Later on it will be explained how movement of the stud 48 is prevented. When the pawl 58 is disengaged from the ratchet-wheel 59, it is kept away from the teeth of this wheel by a spring 67 (Fig. 14).

One should observe that when the stud 48 is not positively prevented from turning in the direction of the arrow Z, the friction between the teeth of the ratchet-wheel 59 and the pawl 58 is sufficient to maintain these two elements in contact notwithstanding the action of the spring 67.

A spring 68 (Figs. 13, 14 and 15) encircles a shaft 69 on which a gear 70 is fixed which gear 70 meshes with the toothed part of the third plate 50. This spring constantly urges this plate to return to a position of rest when it is displaced in the direction of the arrow Z. In this position of rest the toothless sector 53 of the plate 50 is in front of the gear 51.

A stop 71 is provided in the path followed by the pawl 58 when this pawl is moved with the plate 50 under the action of the spring 68. This stop 71 can move around a fixed pivot 72 and is subjected to the action of a spring 73 which allows it to withdraw slightly at a time that the pawl 58 meets it as it moves in a direction opposite to the arrow Z.

A removable rod 74 is engaged in the sleeve 15 (Figs. 3, 4 and 8) to which the torsion springs 14*a*—14*g* and 34 of the disks 10*a* to 10*g* and 31 are fixed. This removable rod 74 passes through a slot 75 (Figs. 13 and 14) cut in the third plate 50 and also in a slot 76 cut in the second plate 41 (Fig. 11). It limits the return movement of this second plate so as to prevent overtravel of this plate 41 which by means of a stud 48 could cause disengagement of the pawl 58 from the teeth of the ratchet-wheel 59 after the stop 71 has re-engaged the pawl 58 in these teeth.

The second toothless sector $\beta$ of the third plate 50 (Figs. 13 and 14) forms, between the toothed parts situated on both sides of it, a peripheral notch 77 in which the extremity 78 of a lever 79, oscillating around a fixed pivot 80, is engaged when the device is at rest. It is in this position that the lever 79 is shown in Fig. 13.

This oscillating lever 79 is connected by means of a fork 81 to a stud 82 mounted on a fourth plate 83 shown in dotted lines in Figs. 13 and 14 and in full lines in Figs. 16 and 17. This plate is coaxial with the first three plates 24, 41 and 50, and with the disks 10*a* to 10*g* and 31. Plate 83 is provided with a circle of holes 84, of which only a few are shown in Figs. 13 and 14, arranged in such a way that the rod 17 of each key 11 can extend into one of them during the depression of the corresponding key and cause an angular displacement of this plate in a direction and for an amount which causes the extremity 78 of the oscillating lever 79 to withdraw from the peripheral notch 77. It is enough for this purpose that the centers of the holes 84 be offset from the axes of the rods 17 and that the ends of the rods 17 taper to a point, as is shown in Figs. 3 and 9. The direction in which the plate 83 is pushed back by depressing a rod 17 is indicated by the arrow T in Figs. 13 and 14. A spring 85 constantly urges this plate in a direction opposite to the arrow T and towards a position of rest in which the oscillating lever 79 enters into the peripheral notch 77.

The fourth plate 83 is arranged slightly above Fig. 15 the third plate 50, and the oscillating lever 79 is arranged at the level of this third plate. This is the reason why the fourth plate 83 has been shown in dotted lines in Figs. 13 and 14.

The fourth plate 83 has clearance cutouts 86 and 87 (Figs. 16 and 17) where several parts pass, among others, the removable shaft 74, the shaft 39 and the sleeve 52.

The peripheral notch 77 of the third plate 50 occupies an angular position such that when the oscillating lever 79 is in the notch 77, the lever 79 prevents the third plate 50 from being moved under the action of the torsion spring 68 until the position is reached in which the pawl 58 used to drive this plate 50 by the motor 60 has engaged the stop 71 which causes the pawl 58 to re-engage the teeth of the ratchet-wheel 59.

The fourth plate 83 controls an interruptor or switch 88 (Figs. 13, 14, 16 and 18) in the energizing system of the motor 60, in such a way that this interruptor is open when none of the keys 11 is depressed and is closed when any one of the keys 11 is depressed.

An interruptor or switch 89 (Fig. 18) that one can maneuver at will is connected in series with the interruptor 88 in the energizing system of the motor 60. A spring 90 constantly urges the interruptor 88 towards a position in which it opens the motor energizing circuit.

*Automatic dialing operation*

Let us suppose that the telephone number to be automatically dialed is already registered in the device of the invention by setting the projections 18*a* to 18*g* in the correct positions and that one desires to dial a number automatically. One closes the interruptor 89 and depresses the corresponding key 11 of the number to be dialed. The depression of the key 11 causes an angular displacement of the fourth plate 83, and consequently, the closing of the interruptor 88. The motor 60 is energized and drives the pawl 58 in the direction of the arrow Z (Fig. 13). The stud 48, the second plate 41 (Figs. 13–15) which carries it and the first plate 24 are driven in the same direction.

At the beginning of the rotation of these plates, the dial 3 is not driven because the toothless sector 53 passes in front of the gear 51. At this time, the gear 40 also is not driven by the plate 41 (Fig. 11) because the toothless sector $\alpha$ of the plate 41 passes in front of this gear 40. Finally, the shaft 39 is prevented from turning by the engagement of the projection 37 of the first plate 24 with the Geneva-wheel 38 (Fig. 6). During this rotation of the plates 50, 41 and 24, the pawl 23 (Fig. 6) carried by the first plate 24 turns the gear 22 through an angle equal to the interval between the two teeth of the gear 22. This rotation is possible notwithstanding the presence of the Geneva-wheel 28 because of the presence of the notch 29 in the first plate 24. The rotatable shaft 19 turns through the same angle as the gear 22, and the arm 36 (Fig. 8), moves out of the space between the adjacent projections 32 of the supplementary disk 31. Thus, this disk 31 moves in the direction of the arrow R (Fig. 8) under the action of the spring 34. This movement continues until its projections 32 are diametrically in line with axes of the rods 17 of the keys 11. The result is that the circular stop 33 of the depressed key 11 is kept under this disk 31 notwithstanding manual release of the key 11 and the action of the compression spring 12.

The above rotation of the rotatable shaft 19 has also caused by means of the arm 20*a* a displacement of the disk 10*a* in the direction of the arrow X (Fig. 4) against the tension spring 14*a*. Because of the rotation of the disk 10*a* one of its projections 13*a* enters into the path followed by the projection 18*a* of the depressed key 11 when this key is rotated.

When the sector $\alpha$ of the second plate 41 has completely passed the gear 40, the toothed part of this plate meshes with this gear (Fig. 11) and turns it, and also the shaft 39, the gear 44, the gear 45 and the gear 46 (Figs. 12 and 9) which has been brought in contact with the gear 45 by depressing the key 11.

Thus one sees that the rod 17 of the depressed key is caused to rotate. This rotation can only take place until the projection 18*a* of this key meets the projection 13*a* of the disk 10*a* which has previously been brought into the path of the projection 18*a*. At this time the second plate 41 is stopped and the stud 48 which it carries causes the pawl 58 to disengage itself from the teeth of the ratchet-wheel 59.

During the rotation which just took place, the teeth of the third plate 50 rotated the gear 51 and, consequently, the dial 3 of the telephone instrument 2. This rotation stops at the moment that the dial 3 has been rotated the amount it would be rotated manually in dialing the first letter or digit of the desired telephone number because the angular position of the projection 18*a* on the rod 17 which has been depressed has been set to produce this effect during the setting-up of the device as explained hereinafter.

When the pawl 58 leaves the teeth of the ratchet-wheel 59, the electric motor 60 continues turning while the third plate 50 turns in the direction opposite to the arrow Z under the action of the torsion spring 68. During part of this new and reverse rotation, the torsion spring of the dial 3 which is included in the telephone instrument 2 acts in the same direction. The final portion of this rotation, that is the one corresponding to the passing of the sector 53 in front of gear 51, is effectuated only under the action of the spring 68.

The return of the third plate 50 is accompanied by the return of the first two plates 41 and 24 because the stud 48 is at one of the extremities of the slot 49 (Figs. 13 and 14) cut into the plate 50. During this return motion, the pawl 58 is maintained away from the teeth of the ratchet-wheel 59 by the spring 67. This position of the pawl 58 exists until the pawl 58 hits against the stop 71. At this time, the pawl 58 is reengaged with the teeth of the ratchet-wheel 59 and the shaft 74 (Fig. 11) stops the second plate 41 because one of the extremities of the slot 76 strikes the shaft 74. These parts are now again in a rest position as shown in Fig. 13.

The rotation of the electric motor 60 then causes a new rotation or second cycle of the plates 50, 41 and 24 in the direction of the arrow Z.

At the beginning of this new rotation or second cycle, while the sectors $\alpha$ and 53 pass before the gears 40 and 51, the pawl 23 drives another tooth of the gear 22 and makes this gear turn through an angle equal to the angular distance between two teeth. At the beginning of this new rotation, the arm 20*a* leaves the previously engaged one of the projections 13*a* of the upper disk 10*a* and this disk comes back in the position as shown in Fig. 4 under the action of its spring 14*a*. During this new rotation of the rotatable shaft 19 the arm 20*b* drives the disk 10*b* by means of one of its projections 13*b* so that the remaining projections 13*b* are in line with the axes of the rods 17. The one among the projections 13*b* which is in front of the depressed key 11 will thus stop the projection 18*b* of the rod 17 operated by the key when it turns because the toothed part of the second plate 41 will drive the gear 40.

The depressed key will thus be stopped again when its projection 18*b* will have turned through, starting from the rest position, an angle proportional to the angle that the dial 3 has to turn in order to dial the second letter or digit of the desired telephone number.

When the projection 18*b* is stopped, the immobilisation of the stud 48 which results causes a new disengagement of the pawl 58 from the teeth of the ratchet-wheel 59. The same operations as described above repeat themselves until all of the different projections 18*a* to 18*g* of the depressed key have been successively put into motion and stopped.

After the return movement of the plates 50, 41 and 24, which follows the stopping of the last projection 18*g*, the pawl 58 is again reengaged with the teeth of the ratchet-wheel 59. Consequently, these three plates begin a new rotation in the direction of the arrow Z. At the beginning of this new movement, the articulated spur-tooth 23 causes a new rotation of the rotatable shaft 19.

The arm 20*g* leaves the previously engaged one of the projections 13*g* which allows the disk 10*g* to return to its position of rest under the action of its spring 14*g*, while the arm 36 drives one of the projections 32 of the supplementary disks 31 (Figs. 5 and 8) used to keep the key 11 in its depressed position. This driving of the disk 31 returns the projections 32 of this disk to a position in which they no longer retain the circular stops 32. Consequently the key 11 that had been depressed moves upwardly from the position where it is shown in Fig. 9 until the rest position shown in Fig. 3 is reached.

While moving upwardly the key 11 which had been depressed becomes disengaged from the fourth plate 83 and, consequently, this plate moves in a direction opposite to the arrow T (Fig. 16) which causes the interruptor 84 to open. Although opening of the interruptor de-energizes the motor 60, its inertia and the inertia of the parts which the motor was driving could cause the rotation of the plates 50, 41 and 24 beyond the position in which the teeth of the plates 50 and 41 begin to mesh with the gears 51 and 40. This supplementary displacement under the effect of inertia of the parts in motion is prevented by the meeting of the projection 43 (Fig. 6) of the first plate 24 with the projection 42 on the rotatable shaft 19. One should note that when this last projection is in the path of the projection 43, the first Geneva-wheel 28 cannot turn because the notch 29 of the plate 24 has passed the position in which this rotation might be possible.

When the plates 50, 41 and 24 are stopped by the projection 42 and the pawl 58 is disengaged from the ratchet-wheel 59, the torsion spring 68 brings the three plates back to their rest positions. This return movement is sufficient for the articulated spur-tooth 23 carried by the disk 24 to return to a position in which it can again drive the wheel 22 during the first movement in the direction of the arrow Z to produce dialing of the first letter or digit of the subsequently selected telephone number.

One should observe that the last return movement of the plate 50 is stopped before the pawl 58 meets the stop 71, because the displacement of the fourth plate 83 in the direction of the arrow T at the time that the key 11 moves upwardly, causes the engagement of the extremity 78 of the oscillating lever 79 with the end of the peripheral notch 77 in the plate 50 (Fig. 13). The position of the peripheral notch 77 is such that the extremity 78 of the lever 79 stops the plate before the pawl 58 strikes the stop 71.

At the time of the next depression of a key 11, the lever 79 is disengaged from the end of the peripheral notch 77, which allows the torsion spring 68 to bring back the plates 50, 41 and 24 in a direction opposite to the arrow Z until the pawl 58 meets the stop 71 and is, by this fact, reengaged with the teeth of the ratchet-wheel 59.

*Setting-up of keys*

The projections 18*a* to 18*g* corresponding to the same key are each fixed to a gear which is rotatable on the rod 17 of the key 11 but which fits snugly enough on the rod 17 to prevent free rotation thereon. These gears are represented by 91*a* to 91*g*. In order to simplify Figs. 3 and 9, only the gears 91*a* and 91*g* have been designated by reference characters.

In order to make these different gears 91*a*—91*g* rotatable with the rod 17 on which they are mounted, such gears mesh with an elongated gear 92 (Figs. 3, 4 and 9). Each of these gears 92 also meshes with the gear 46 axially movable with the rod 17 of the corresponding key 11. Each gear 92 is manually removable. One can withdraw it from the device by grasping it by a button 93 (Figs. 1, 3 and 9). When the gear 92 is in place, the gears 91*a* and 91*b* turn at the same time as the gear 46, and when this gear 92 is removed, the gears 91*a*—91*g* turn with the gear 46 only as long as one of the stops 13*a* to 13*g* are not in the paths of the projections 18*a*—18*g*.

One should observe that when the keys 11 are released the gears 46 of these keys mesh with the fixed gear 47 (Figs. 2, 3 and 9) and that, consequently, they always keep the same angular position during the periods when the gear 92 is removed. The gear 47 is prevented from turning by the sleeve 50 which passes through a slot 99 (Fig. 19).

A small crank 94 is shown in dotted lines in Figs. 2, 10, 13 and 14 which crank is removably mounted on a shaft 95 (Figs. 10, 13 and 14). This shaft 95 is rotatably fixed to a gear 96 which meshes with the teeth of the second plate 41 (Fig. 10).

By means of the elements 91 to 96 used in combination with some of the elements mentioned above, the caller can easily set up the telephone numbers he desires to be dialed automatically by means of the keys 11.

Let us suppose that no number as yet has been set up and that one desires to use a selected key 11 to initiate automatic dialing of a telephone number.

The operator of the device opens the interruptor 89 which is in the energizing circuit of the motor 60. The operator removes the gear 92 corresponding to the key 11 that will be used subsequently to initiate dialing of the telephone number automatically and depressed the selected key 11. After this, the operator turns the small crank 94, visible in Figs. 13 and 14, in a clockwise direction. The gear 96 fixed on the shaft 95, turns the second plate 41 in a counter-clockwise direction. The first plate 24 which turns with the plate 41 causes, by means of the articulated spur-tooth 23, the rotation of the rotatable shaft 19 in a clock-wise direction. The arm 36 carried by the shaft 19 releases one of the projections 32 of the disk 30 and this disk places itself in the position in which a projection 32 keeps the key depressed.

The rotation of the shaft 19 also causes the driving of the disk 10*a* in a counter-clockwise direction until its projections are diametrally in line with axes of the rods 17 of the keys 11. The projections 18*a* to 18*g* occupy, at rest, positions in which they are not in the paths of the projections 13*a* to 13*g*. To reach these projections 13*a* to 13*g* in line with the rod 17 of the selected key 11, the projections 18*a* to 18*g* should turn through an angle related to the arcuate distance between two finger holes in the dial 3.

At the beginning of the rotation of the plates 50, 41 and 24, the shaft 39 is immobilised because the second Geneva-wheel 38 engages the projection 37 of the plate 24. When the teeth of the plate 41 begin to mesh with the gear 40, the depressed key 11 is rotated by means of shaft 39, of gear 44, and of gears 45 and 46. The rotation of the plate 41 is accompanied by the rotation of the plate 50 and, consequently, of the dial 3 which is driven by the plate 50 as described above.

The operator continues to turn the small crank 94 clockwise until the finger hole in the dial 3 corresponding to the first letter or digit of the desired telephone number is brought into the position it would occupy if the letter or digit were dialed manually, e. g. adjacent the finger stop. During this rotation the gear 91*a* is first driven by friction with the rod 17 but eventually, the projection 18*a* which is rotatable with the gear 91*a*, is stopped by the projection 13*a* which is then diametrally in line with axis of the rod 17 of the depressed key 11. The projection 18*a* and the corresponding gear 91*a* are then immobilized while the dial 3 goes on turning until the desired finger hole has been brought to the end of the dialing movement.

If the operator then releases the small crank 94, the spring 68 brings back the plates 24, 41 and 50 to the starting position. The projection 18*a* returns through an angle related to the angle through which the dial 3 moves in returning to its rest position and hence, to the angle through which the dial 3 moved during the clockwise rotation of the small crank 94.

In order to set-up the following letters or digits of the telephone number the operator operates the crank 94 in the same manner; the beginning of the rotation of the rotatable shaft 19 causes each time, on one hand, the release of one of the disks 10*a* to 10*g* which has been brought during the preceding manipulation to the stop position of the corresponding one of the projections 18*a* to 18*g* and, on the other hand, the driving of the next disk to the stop position of another one of the projections 18*a* to 18*g*. Because the preceding disk, for instance the disk 10*a*, has returned to the position in which it cannot engage the projection 18*a*, during the new manipulation of the crank 94 in the clockwise direction, this projection 18*a* keeps, with respect to the rod 17 on which it is mounted, the same angular position as the one to which it had been brought when it was stopped by a projection 13*a* on the disk 10*a*.

When the rotatable shaft 19 has made a complete turn, the disk 31 is brought by the arm 36 into the position shown in Fig. 8 and the key 11 which has been depressed automatically moves upwards under the action of spring 12. The operator can then block the different gears 91*a* to 91*g* angularly with respect to the corresponding wheel 46 by putting the gear 92 back in place.

*Clearing of key settings*

The gear 45 has a circular slot 97 (Fig. 20) through which the sleeve 15 passes. When the gear 45 is rotated in the direction of the arrow R the end 98 of the slot 97 hits against the sleeve 15, and the gear 45 is immobilised and consequently the three plates 24, 41 and 50 are also immobilised.

When the gear 45 is rotated in a direction corresponding to the arrow R, the projections 18*a* to 18*g* move in a counter-clockwise direction. When the gear 45 is at its rest position, the end 98 of the slot 97 is arranged with respect to the sleeve 15 in such a way that the projections 18*a* to 18*g* carried by the rod 17 of a key can, during the displacement of the gear 45 in the direction of the arrow R, reach the projections 13*a* to 13*g* brought in line with the corresponding rod 17.

In order to wipe out a previously registered telephone number, the operator opens the interrupter 89, removes the elongated gear 92 which causes the projections 18*a* to 18*g* to rotate with the gear 46 and depresses the key 11 corresponding to the telephone number that it is desired to wipe out. The operator begins by turning the crank 94 in a clockwise direction until the rotatable shaft 19 has driven the disk 31 to the position of blocking of the depressed key and has driven the disk 10*a* into the position in which one of its projections 13*a* is in front of the depressed key. For this it is enough to turn the crank until the dial 3 begins to displace itself.

Afterwards the operator turns the crank 94 in a counter-clockwise direction until a stop is encountered. Further turning is prevented by the meeting of the end 98 of the slot 97 cut in the gear 45 with the sleeve 15. Before this stop is felt the projection 18*a* has been stopped by the projection 13*a* in front of the depressed key, provided the movement of the end 98 is greater than the movement required to wipe out the smallest digit on the dial 3. When the striking of the end 98 against the sleeve 15 is felt, the operator turns the crank 94 in a clockwise direction until the dial 3 has come back to its position of rest. The operator performs the same maneuvers for each one of the letters or digits of the telephone number to be subsequently registered. When these manipulations are finished, all the projections 18*a* to 18*g* are in the same alignment and the device is ready for a new setting up.

In the form of the invention which has been described, the projection 42 is situated under the gear 22 as an extension of one of the teeth of the gear 22, but it is to be understood that this projection 42, which has to be rotatably fixed with respect to the rotatable shaft 19, could occupy another position and may, for example, be located above the first Geneva-wheel 28. In this case the projection 43 on the first plate 24 would of course be at the same level as the projection 42.

If the telephone number to be called has less than a total of seven letters and/or digits, there would be less than seven disks 10*a* to 10*g*. The number of disks is always equal to the number of letters and/or digits in the telephone number. In order not to have to change the other elements of the device, it would be sufficient to provide the rotatable shaft 19 with supplementary projections 42 equal in number to the total number of letters and/or digits in the longest telephone number less the minimum number of the disks 10*a* to 10*g* which are likely to be used.

Instead of making the gears 91*a* to 91*g* fixed or free by putting in or taking out the toothed cylinder 92, one could use other ways of making these gears rotatably fixed with respect to the rod 17 which carries them. One could, for instance, exert an axial pressure against these different gears to hold them against the piece provided with the circular stop 33 and which is rotatably fixed during rotation with respect to the rod 17.

It is evident that the invention is not exclusively limited to the embodiment described above and that many modifications could be made in the form, the disposition and constitution of certain of the elements employed to accomplish the results of the invention, provided these modifications are within the scope of the invention as defined in the following claims.

We claim:

1. An automatic dial operator comprising means for engaging a dial, motor means, cam means settable to predetermined positions, said positions being determined by the successive positions to which said dial is to be operated, clutch means drivingly connecting said motor means to said engaging means for causing movement of said engaging means by said motor means, key means for interconnecting said cam means and said clutch means for causing operation of said cam means by said motor means, said clutch means being force sensitive and disconnecting said engaging means from said motor means when the force transmitted to said cam means by said clutch means exceeds a predetermined value and said cam means having means operating in predetermined positions thereof for increasing the force required for the operation thereof above said predetermined value.

2. An automatic telephone dial operator comprising means for engaging a telephone dial, motor means, cam means settable to predetermined positions, said positions being determined by the code elements of a telephone number to be called, clutch means drivingly connecting said motor means to said engaging means for causing movement of said engaging means by said motor means, key means for interconnecting said cam means and said clutch means for causing operation of said cam means by said motor means, said clutch means being force sensitive and disconnecting said engaging means from said motor means when the force transmitted to said cam means by said clutch means exceeds a predetermined value and said cam means having means operating in predetermined positions thereof for increasing the force required for the operation thereof above said predetermined value.

3. An automatic telephone dial operator comprising means for engaging a telephone dial and having an idle position, motor means, cam means settable to predetermined positions, said positions being determined by the code elements of a telephone number to be called, clutch means drivingly connecting said motor means to said engaging means for causing movement of said engaging means by said motor means, key means for interconnecting said cam means and said clutch means for causing operation of said cam means by said motor means and for thereby causing movement of said cam means from its idle position, said clutch means being force sensitive and disconnecting said engaging means and said cam means from said motor means when the force transmitted to said cam means by said clutch means exceeds a predetermined value and said cam means having means operating in predetermined positions thereof for increasing the force required for the operation thereof above said predetermined value, and means for restoring said cam means and said engaging means to their idle positions upon disconnection thereof from said motor means.

4. An automatic dial operator comprising dial engaging means having an idle position, driving means connected to said engaging means for moving said engaging means from its idle position and for subsequently restoring to its idle position, rotatable key means connected to said driving means for controlling said driving means and operable in predetermined positions thereof to cause said driving means to discontinue its movement of said engaging means away from its idle position, a plurality of detents each engageable with a portion of said key means in said predetermined positions thereof, means for successively moving said detents into engagement with said key means and means for operating said driving means and said moving means in timed relationship.

5. An automatic dial operator comprising dial engaging means, motor means, means drivingly interconnecting said dial engaging means and said motor means comprising ratchet means and pawl means engageable with and disengageable from said ratchet means and further means including a plurality of settable cam means driven by said motor means and means controlled by said cam means and acting on one of said ratchet and pawl means at successive times determined by the setting of said cam means to disengage said pawl means from said ratchet means.

6. An automatic dial operator comprising motor means; first gear means; ratchet and pawl means drivingly interconnecting said gear means and said motor means; first driving means engageable with a telephone dial and driven by said first gear means; a plurality of keys, each said key being rotatable and movable axially from an idle position to a dialing position; a plurality of members mounted on each said key, said members each having a stop thereon; second gear means; second driving means drivingly connected to said second gear means and to said ratchet and pawl means for causing movement of said second gear means by said motor means, the pawl of said ratchet and pawl means being released from its engagement with the ratchet thereof when the force applied to said ratchet and pawl means by said second driving means exceeds a predetermined value; means connected to said gear means for restoring said gear means to predetermined idle positions upon release of said pawl as aforesaid; means acting on said pawl in the idle position of said first gear means to cause said pawl to engage said ratchet; third gear means on each said key engageable with said second gear means in said dialing position of said key, said keys being rotatable by said second gear means; a control member movable by one of said gear means from an idle position; a control drive member comprising a toothed wheel having a plurality of teeth, said toothed wheel being mounted on a shaft and being drivingly connected therewith, a plurality of projections on said shaft disposed at different peripheral positions thereon; means on said control member and engageable with said toothed wheel upon movement of said control member from its idle position to cause intermittent movement of said shaft; and a plurality of movable code members, said code members each having means thereon engageable with one of said further projections and with one of said stops on one of said plurality of members on a key in its dialing position whereby each of said code members is successively displaced by said further projections and said code members in the displaced positions thereof successively engage said stops on said plurality of members in predetermined angular positions thereof to cause a force exceeding said predetermined value to be applied to said ratchet and pawl means.

7. An automatic dial operator comprising motor means; a ratchet wheel driven by said motor means; first gear means; a pivoted pawl drivingly connected to said gear means and engageable with said wheel; first driving means engageable with a telephone dial and driven by said first gear means; a plurality of keys, each said key being rotatable and movable axially from an idle position to a dialing position; a plurality of members mounted on each said key, said members each having a stop thereon; second gear means; second driving means drivingly connected to said second gear means and engageable with said pawl intermediate the pivot thereof and the portion thereof engageable with said wheel for causing movement of said second gear means by said motor means, said pawl being released from its engagement with said wheel when the force applied thereto by said second driving means exceeds a predetermined value; means connected to said gear means for restoring said gear means to predetermined idle positions upon release of said pawl as aforesaid; means acting on said pawl in the idle position of said first gear means to cause said pawl to engage said ratchet wheel; third gear means on each said key engageable with said second gear means in said dialing position of said key, said keys being rotatable by said second gear means; a control disc movable by one of said gear means from an idle position; a control drive member comprising a toothed wheel having a plurality of teeth, said toothed wheel being mounted on a shaft and being drivingly connected therewith, a plurality of projections on said shaft disposed at different peripheral positions thereon; a second pawl mounted on said control disc and engageable with said toothed wheel upon movement of said disc from its idle position to cause intermittent movement of said shaft; and a plurality of movable code plates, said code plates having means thereon engageable with one of said further projections and with one of said stops on one of said plurality of members on a key in its dialing position whereby each of said plates is successively displaced by said further projections and said code plates in the displaced positions thereof successively engage said stops on said plurality of members in predetermined angular positions thereof to cause a force exceeding said predetermined value to be applied to said first-mentioned pawl.

8. An automatic dial operator comprising motor means; a ratchet wheel driven by said motor means; first gear means; a pivoted pawl drivingly connected to said gear means and engageable with said wheel; second gear means engageable with said first gear means after a predetermined amount of movement of the latter and rotatable by said first gear means; first driving means engageable with a telephone dial and driven by said second gear means; a plurality of keys, each key being rotatable and movable axially from an idle position to a dialing position; a plurality of members mounted on each said key, said members each having a stop thereon and said members being selectively and rotatably adjustable on each said key for adjusting the angular position of the stop thereon; means engageable with said members after adjustment thereof for maintaining said members in their adjusted positions; third gear means; second driving means drivingly connected to said third gear means and engageable with said pawl intermediate the pivot thereof and the portion thereof engageable with said wheel for causing movement of said third gear means by said motor means, said pawl being released from its engagement with said wheel when the force applied thereto by said second driving means exceeds a predetermined value; means connected to said gear means for restoring said gear means to predetermined idle positions upon release of said pawl as aforesaid; means acting on said pawl in the idle position of said first gear means to cause said pawl to engage said ratchet wheel; fourth gear means engageable with said third gear means after a predetermined amount of movement of the latter and rotatable by said third gear means; fifth gear means on each said key engageable with said fourth gear means in said dialing position of said key, said keys being rotatable by said fourth gear means; a control disc movable by said third gear means from an idle position; a control drive member comprising a first wheel engageable with said control disc in the idle position of said disc for restraining movement of said first wheel and disengageable from said disc in a second position of said disc to permit rotation of said first wheel, a toothed wheel having a plurality of teeth, said two last-mentioned wheels being mounted on a shaft and being drivingly connected therewith, a first projection on said shaft and a further plurality of projections on said shaft disposed at different peripheral and axial positions thereon; a second pawl mounted on said control disc and engageable with said toothed wheel upon movement of said disc from its idle position to cause intermittent movement of said shaft and a stop drivingly connected with said control disc and engageable with said first projection upon movement of said control disc from its idle position after said code elements have been dialed whereby a force exceeding said predetermined value is applied to said first-mentioned pawl; a plurality of independently rotatable code discs mounted one above the other, said code discs having teeth thereon and each being mounted with said teeth engageable with one of said further projections and with one of said stops on one of said plurality of members on a key in its dialing position whereby each of said discs is successively rotated by said further projections and teeth on said code discs in the rotated positions of said code discs successively engage said stops on said plurality of members in predetermined angular positions thereof to cause a force exceeding said predetermined value to be applied to said first-mentioned pawl; a toothed control disc having a number of teeth at least equal to the number of said keys, said toothed control disc being mounted with the teeth thereof engageable with one of said further projections to cause said toothed control disc to assume an active position during dialing and to rotate to an idle position after dialing is completed, the other teeth of said toothed control disc being out of the paths of movement of said keys when said last-mentioned disc is in its idle position and vice versa; a switch plate rotatable by said keys in moving from idle to active positions; a control switch for energizing said motor means, said plate having means thereon engageable with said switch upon rotation of said plate to actuate said switch; and a third pawl engageable with said first gear means for preventing restoration of said first gear means to its idle position, said plate having means thereon for disengaging said third pawl from said first gear means upon rotation of said plate by a key.

9. An automatic dial operator comprising motor means; a ratchet wheel driven by said motor means; first gear means; a pivoted pawl drivingly connected to said gear means and engageable with said wheel; second gear means engageable with said first gear means after a predetermined amount of movement of the latter and rotatable by said first gear means; first driving means engageable with a telephone dial and driven by said second gear means; a manually operable dial drivingly connected to said driving means; a plurality of keys corresponding in number to the number of telephone codes to be dialed, said keys each being rotatable and movable axially from an idle position to a dialing position; a plurality of members mounted on each said key, said members corresponding in number to the number of elements in a telephone code to be dialed and each having a stop thereon and said members being selectively and rotatably adjustable on each said key for adjusting the angular position of the stop thereon; pin means engageable with said members after adjustment thereof for maintaining said members in their adjusted positions; third gear means; second driving means drivingly connected to said third gear means and engageable with said pawl intermediate the pivot thereof and the portion thereof engageable with said wheel for causing movement of said third gear means by said motor means, said pawl being released from its engagement with said wheel when the force applied thereto by said second driving means exceeds a predetermined value; means connected to said gear means for restoring said gear means to predetermined idle positions upon release of said pawl as aforesaid; means acting on said pawl in the idle position of said first gear means to cause said pawl to engage said ratchet wheel; fourth gear means engageable with said third gear means after a predetermined amount of movement of the latter and rotatable by said third gear means; fifth gear means on each said key engageable with said fourth gear means in said dialing position of said key, said keys being rotatable by said fourth gear means; a control disc movable by said third gear means from an idle position; a cam connected to said fourth gear means, said control disc having a portion engageable with said cam during initial movement thereof for restraining said cam during said predetermined amount of movement of said first and third gear means, said portion being disengaged therefrom after said initial movement; a control drive member comprising a first wheel engageable with said control disc in the idle position of said disc for restraining movement of said first wheel and disengageable from said disc in a second position of said disc to permit rotation of said first wheel, a toothed wheel having a number of teeth equal to said number of code elements plus one, said two last-mentioned wheels being mounted on a shaft and being drivingly connected therewith, a first projection on said shaft and a further plurality of projections on said shaft disposed at different peripheral and axial positions thereon; a second pawl mounted on said control disc and engageable with said toothed wheel upon movement of said disc from its idle position to cause intermittent rotation of said shaft and a stop drivingly connected with said control disc and engageable with said first projection upon movement of said control disc from its idle position after said code elements have been dialed whereby a force exceeding said predetermined value is applied to said first-mentioned pawl; a plurality of independently rotatable code discs mounted with a common axis and one above the other, said code discs having teeth thereon and each being mounted with said teeth engageable with one of said further projections and with one of said stops on one of said plurality of members on a key in its dialing position whereby each of said discs is successively rotated by said further projections and teeth on said code discs in the rotated positions of said code discs successively engage said stops on said plurality of members in predetermined angular positions thereof to cause a force exceeding said predetermined value to be applied to said first-mentioned pawl; a toothed control disc having a number of teeth at least equal to the number of said keys, said toothed control disc being mounted with the teeth thereof engageable with one of said further projections to cause said toothed control disc to assume an active position during dialing and to rotate to an idle position after dialing is completed, said keys each having a flanged member thereon and the other teeth of said toothed control disc being out of the paths of movement of said keys when said last-mentioned disc is in its idle position and vice versa; a switch plate rotatable by said keys in moving from idle to dialing positions; a control switch for energizing said motor means, said plate having means thereon engageable with said switch upon rotation of said plate to actuate said switch; a third pawl engageable with said first gear means for preventing restoration of said first gear means to its idle position, said plate having means thereon for disengaging said third pawl from said first gear means upon rotation of said plate by a key; and manually operable means engageable with said fourth gear means for rotating said fourth gear means and for setting said plurality of members.

References Cited in the file of this patent

UNITED STATES PATENTS

| | | |
| --- | --- | --- |
| 1,927,413 | Morin | Sept. 19, 1933 |
| 2,656,417 | Kilburg | Oct. 20, 1953 |